(12) United States Patent
Murai et al.

(10) Patent No.: US 10,737,471 B2
(45) Date of Patent: Aug. 11, 2020

(54) SYNTHETIC RESIN LAMINATE HAVING PHOTOCHROMIC PROPERTIES AND LENS USING SAME

(71) Applicants: MITSUBISHI GAS CHEMICAL COMPANY, INC., Tokyo (JP); MGC FILSHEET CO., LTD., Saitama (JP)

(72) Inventors: Katsuyuki Murai, Tokyo (JP); Kyousuke Nakamura, Saitama (JP); Hideaki Kimura, Saitama (JP)

(73) Assignees: MITSUBISHI GAS CHEMICAL COMPANY, INC., Tokyo (JP); MGC FILSHEET CO., LTD., Saitama (JP)

( * ) Notice: Subject to any disclaimer, the term of this patent is extended or adjusted under 35 U.S.C. 154(b) by 101 days.

(21) Appl. No.: 16/082,116

(22) PCT Filed: Mar. 7, 2017

(86) PCT No.: PCT/JP2017/009000
§ 371 (c)(1),
(2) Date: Sep. 4, 2018

(87) PCT Pub. No.: WO2017/154901
PCT Pub. Date: Sep. 14, 2017

(65) Prior Publication Data
US 2019/0084278 A1     Mar. 21, 2019

(30) Foreign Application Priority Data
Mar. 10, 2016   (JP) .................................. 2016-046844

(51) Int. Cl.
*G02C 3/00*  (2006.01)
*G02C 5/00*  (2006.01)
(Continued)

(52) U.S. Cl.
CPC ................ *B32B 23/08* (2013.01); *B32B 7/12* (2013.01); *B32B 23/20* (2013.01); *B32B 27/08* (2013.01);
(Continued)

(58) Field of Classification Search
CPC ... G02C 5/00; G02C 7/10; G02C 7/12; G02C 7/02; G02C 7/04; G02C 7/08
(Continued)

(56) References Cited

U.S. PATENT DOCUMENTS 7,884,992 B1 *  2/2011  Wang ....................... G02B 5/23
                                                      349/13
8,649,081 B1    2/2014  Demeio et al.
(Continued)

FOREIGN PATENT DOCUMENTS

JP      63-178193 A      7/1988
JP      2005500925 A     1/2005
(Continued)

OTHER PUBLICATIONS

International Search Report in International Patent Application No. PCT/JP2017/009000, dated May 30, 2017.
(Continued)

*Primary Examiner* — Dawayne Pinkney
(74) *Attorney, Agent, or Firm* — Greenblum & Bernstein, P.L.C.

(57) ABSTRACT

According to the present invention, a synthetic resin laminate comprising two transparent synthetic resin layers (A), two or more functional layers (B) having photochromic properties interposed between the two synthetic resin layers (A), and a transparent resin layer (C) interposed between the two or more functional layers (B), wherein the functional
(Continued)

layer (B) is a cured layer comprising a photochromic dye and obtained from a diisocyanate and a polyol can be provided.

11 Claims, 1 Drawing Sheet

(51) Int. Cl.
| | |
|---|---|
| G02C 7/02 | (2006.01) |
| G02C 7/00 | (2006.01) |
| B32B 23/08 | (2006.01) |
| G02C 7/12 | (2006.01) |
| G02B 5/23 | (2006.01) |
| B32B 27/40 | (2006.01) |
| G02B 3/02 | (2006.01) |
| G02C 7/10 | (2006.01) |
| B32B 27/18 | (2006.01) |
| B32B 7/12 | (2006.01) |
| B32B 23/20 | (2006.01) |
| B32B 27/08 | (2006.01) |
| B32B 27/30 | (2006.01) |
| B32B 27/34 | (2006.01) |
| B32B 27/36 | (2006.01) |

(52) U.S. Cl.
CPC ............ *B32B 27/18* (2013.01); *B32B 27/306* (2013.01); *B32B 27/308* (2013.01); *B32B 27/34* (2013.01); *B32B 27/365* (2013.01); *B32B 27/40* (2013.01); *G02B 3/02* (2013.01); *G02B 5/23* (2013.01); *G02C 7/10* (2013.01); *G02C 7/102* (2013.01); *G02C 7/12* (2013.01); *B32B 2250/24* (2013.01); *B32B 2255/10* (2013.01); *B32B 2255/26* (2013.01); *B32B 2307/412* (2013.01); *B32B 2307/42* (2013.01); *B32B 2551/00* (2013.01)

(58) Field of Classification Search
USPC ...... 351/159.61, 41, 44, 49, 159.01, 159.02, 351/159.39, 159.6, 159.75
See application file for complete search history.

(56) References Cited

U.S. PATENT DOCUMENTS

| | | | |
|---|---|---|---|
| 2004/0126587 A1* | 7/2004 | Maki | B29D 11/0073 428/412 |
| 2004/0156086 A1 | 8/2004 | Nishizawa et al. | |
| 2004/0263777 A1 | 12/2004 | Kim | |
| 2005/0136260 A1 | 6/2005 | Garcia | |
| 2005/0168690 A1* | 8/2005 | Kawai | B29C 39/025 351/159.6 |
| 2011/0043902 A1 | 2/2011 | Ishibashi et al. | |
| 2014/0036227 A1 | 2/2014 | Tamura et al. | |
| 2015/0205011 A1 | 7/2015 | Gotou et al. | |

FOREIGN PATENT DOCUMENTS

| | | |
|---|---|---|
| JP | 200717636 A | 1/2007 |
| JP | 200725609 A | 2/2007 |
| JP | 4586953 B2 | 9/2010 |
| JP | 201248113 A | 3/2012 |
| JP | 201432273 A | 2/2014 |
| JP | 5559497 B2 | 7/2014 |
| JP | 2015535946 A | 12/2015 |
| TW | 201423203 | 6/2014 |
| WO | 02099513 A1 | 12/2002 |

OTHER PUBLICATIONS

International Preliminary Report on Patentability in International Patent Application No. PCT/JP2017/009000, dated Sep. 11, 2018.
Extended European Search Report dated Aug. 20, 2019 in European application No. 17763241.1.

* cited by examiner

[Figure 1]
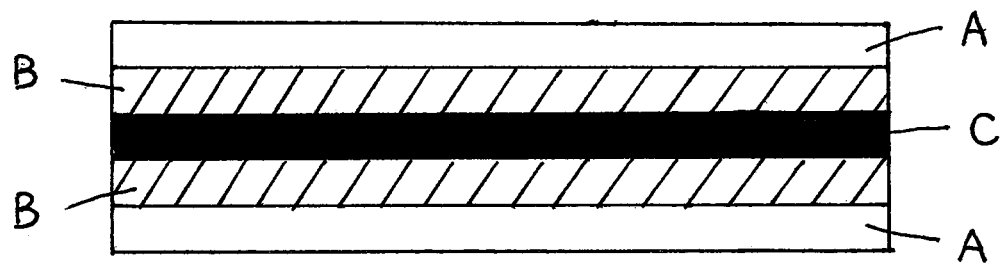
[Figure 2]
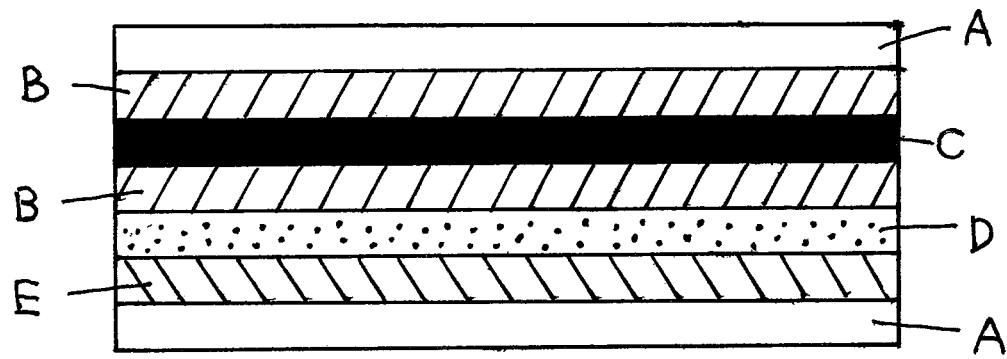

SYNTHETIC RESIN LAMINATE HAVING PHOTOCHROMIC PROPERTIES AND LENS USING SAME

TECHNICAL FIELD

The present invention relates to a synthetic resin laminate having photochromic properties preferably used for sunglasses, goggles, corrective lenses, or the like, and a lens using the same.

BACKGROUND ART

For conventional optical lenses, particularly photochromic lenses, generally those using inorganic materials have spread. In other words, generally, a coating layer has been added to the surface of glass or a curable plastic such as CR-39 using an inorganic material having photochromic properties. Recently, plastic lenses having high impact resistance as lenses themselves have spread. Particularly, in the United States, lenses using polycarbonates spread widely, and the demand for sunglasses having impact resistance suitable for outdoor activities increases rapidly.

Conventionally, synthetic resin laminates having photochromic properties have been known including those obtained by adding a photochromic organic compound to a silicone-based surface curing coating material, applying the coating material to one surface of a laminate, followed by curing, and those obtained by adding a photochromic dye to a urethane-based coating material, applying the coating material to one surface of a synthetic resin laminate, followed by curing (Patent Document 1).

However, in the method of applying a coating material containing a photochromic dye to one surface of a synthetic resin laminate, the step of coating an individual laminate has been added, cracks have occurred due to the solvent in the coating component to cause poor appearance, and in addition it has also been difficult to limit the coated portion to only the desired portion, and there have been limitations in terms of product design.

Further, a method of direct kneading into a synthetic resin has been attempted, but a problem has been that due to the insufficient heat resistance of the photochromic dye during kneading, the decomposition and deterioration of the dye occur, causing insufficient exhibition of photochromic properties, and decreases in the physical properties of the synthetic resin laminate itself.

Patent Document 2 discloses a method of forming a synthetic resin laminate having photochromic properties in which two transparent resins are adhered with a polyurethane resin to which a photochromic dye is added. Patent Document 3 discloses a method of forming a lens by applying or transferring a resin layer having photochromic properties to a transparent plastic sheet and injection-molding a backup resin on the above resin layer. But, in the prior art, due to the problem of the low solubility of the photochromic dye, the thickness of the polyurethane resin layer having photochromic properties has increased in order to obtain sufficient contrast, and it has been difficult to perform control so that the layer is smooth and the thickness is uniform. The nonuniformity of thickness is exhibited as the unevenness of light and shade during coloring as it is, and therefore is not practically preferred. Further problems have been that delamination is likely to occur, and warpage occurs in the synthetic resin laminate due to the curing and shrinkage of the polyurethane resin.

In this manner, under present circumstances, a transparent synthetic resin laminate having photochromic properties that is good in coloring and excellent in the control of the surface smoothness of a coating of a layer having photochromic properties and the thickness of the coating is not obtained as a photochromic lens.

PRIOR ART DOCUMENTS

Patent Documents

Patent Document 1: Japanese Patent Laid-Open No. 63-178193
Patent Document 2: Japanese Patent No. 4586953
Patent Document 3: Japanese Patent No. 5559497

SUMMARY OF THE INVENTION

Problems to be Solved by the Invention

The present invention intends to solve the problems accompanying the conventional art as described above, and it is an object of the present invention to provide a transparent synthetic resin laminate having photochromic properties that has good contrast of coloring, has no in-plane coloring unevenness, and is excellent in the control of the smoothness of the surface of a coating of a layer having photochromic properties and the thickness of the coating.

Means for Solving the Problems

The present inventors have studied the above conventional problems in view of such circumstances, and as a result found that the above problems can be solved by the present invention below, and completed the present invention.

Specifically, the present invention is as follows:

<1> A synthetic resin laminate comprising two transparent synthetic resin layers (A), two or more functional layers (B) having photochromic properties interposed between the two synthetic resin layers (A), and a transparent resin layer (C) interposed between the two or more functional layers (B), wherein the functional layer (B) is a cured layer comprising a photochromic dye and obtained from a diisocyanate and a polyol.

<2> The synthetic resin laminate according to the above <1>, comprising a resin layer (D) having polarization properties and an adhesive material layer (E) between one of the functional layers (B) and one of the synthetic resin layers (A) present opposite to the resin layer (C) in order from the side of the functional layer (B).

<3> The synthetic resin laminate according to the above <1> or <2>, wherein the resin layer (C) has polarization properties.

<4> The synthetic resin laminate according to any of the above <1> to <3>, wherein a total of thicknesses of all functional layers (B) interposed between the two transparent synthetic resin layers (A) is 30 μm or more, and a thickness of the individual functional layer (B) is 25 μm or less.

<5> The synthetic resin laminate according to any of the above <1> to <4>, wherein at least one of the transparent synthetic resin layers (A) is a single layer comprising one selected from the group consisting of an aromatic polycarbonate, a poly(meth)acrylate, acetyl cellulose, a polyamide, and a mixture of an aromatic polycarbonate and an alicyclic polyester, or a multilayer obtained by laminating and integrating two or more thereof.

<6> The synthetic resin laminate according to the above <5>, wherein both of the transparent synthetic resin layers (A) are single layers comprising an aromatic polycarbonate.
<7> The synthetic resin laminate according to any of the above <1> to <6>, wherein the transparent resin layer (C) interposed between the functional layers (B) comprises one or more selected from the group consisting of an aromatic polycarbonate, a poly(meth)acrylate, acetyl cellulose, a polyamide, a polyester, and a mixture of an aromatic polycarbonate and an alicyclic polyester.
<8> The synthetic resin laminate according to the above <7>, wherein the transparent resin layer (C) interposed between the functional layers (B) comprises triacetyl cellulose.
<9> A lens obtained by subjecting the synthetic resin laminate according to any of the above <1> to <8> to bending work into a spherical surface or an aspherical surface.
<10> A lens obtained by subjecting the synthetic resin laminate according to any of the above <1> to <8> to bending work, and comprising an integrally injection-molded body of a transparent resin on the side of a depressed surface.
<11> Eyewear using the lens according to the above <9> or <10>.

Advantageous Effect of the Invention

The present invention can provide a transparent synthetic resin laminate having photochromic properties that has good contrast of coloring, has no in-plane coloring unevenness, and is excellent in the control of the thickness of a coating of a layer having photochromic properties, and a photochromic lens using the synthetic resin laminate.

BRIEF DESCRIPTION OF DRAWINGS

FIG. 1 is a schematic cross-sectional view showing one embodiment of the synthetic resin laminate of the present invention.

FIG. 2 is a schematic cross-sectional view showing another embodiment of the synthetic resin laminate of the present invention.

EMBODIMENTS FOR CARRYING OUT THE INVENTION

The present invention will be described in detail below.

A schematic cross-sectional view showing one embodiment of the synthetic resin laminate of the present invention is shown in FIG. 1. The synthetic resin laminate described in FIG. 1 has two transparent synthetic resin layers (A), two functional layers (B) having photochromic properties interposed between the two synthetic resin layers (A), and a transparent resin layer (C) interposed between the two functional layers (B).

Next, a schematic cross-sectional view showing another embodiment of the synthetic resin laminate of the present invention is shown in FIG. 2. The synthetic resin laminate described in FIG. 2 has a resin layer (D) having polarization properties and an adhesive material layer (E) between one of the two functional layers (B) having photochromic properties and one of the above synthetic resin layers (A) present opposite to the transparent resin layer (C) in order from the side of the above functional layer (B) with respect to the synthetic resin laminate described in FIG. 1.

The synthetic resin laminate of the present invention is not limited in any way to the embodiments shown in FIG. 1 and FIG. 2.

The resin used as the transparent synthetic resin layer (A) in the present invention can be selected, for example, from the group consisting of an aromatic polycarbonate, a poly (meth)acrylate, acetyl cellulose, a polyamide, and a mixture of an aromatic polycarbonate and an alicyclic polyester. In the present invention, two transparent synthetic resin layers (A) are used, and each may comprise the same resin component or a different resin component. From the viewpoint of the warpage and bending workability of the synthetic resin laminate, the two transparent synthetic resin layers (A) preferably comprise the same resin component. The transparent synthetic resin layer (A) in the present invention may be a single layer comprising one selected from the group consisting of an aromatic polycarbonate, a poly(meth)acrylate, acetyl cellulose, a polyamide, and a mixture of an aromatic polycarbonate and an alicyclic polyester, or a multilayer obtained by laminating and integrating two or more thereof.

Among the above resin components, an aromatic polycarbonate is preferred, and it is more preferred that both of the transparent synthetic resin layers (A) in the present invention are single layers comprising an aromatic polycarbonate.

Especially a thermoplastic polycarbonate polymer that may be branched and is made by reacting an aromatic dihydroxy compound or an aromatic dihydroxy compound and a small amount of a polyhydroxy compound with phosgene or a diester of carbonic acid is more preferred. The aromatic dihydroxy compound is a compound represented by the following general formula (a) or general formula (b):

general formula (a)

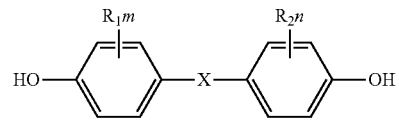

general formula (b)

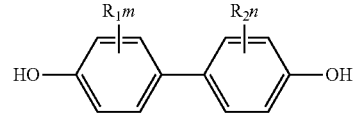

In the above general formula (a), X is as follows:

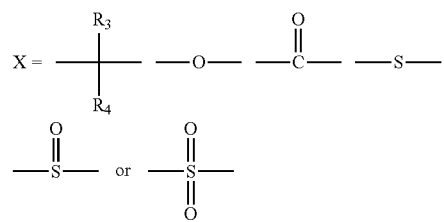

wherein $R_1$ and $R_2$ are each a hydrogen atom or an alkyl group having 1 to 10 carbon atoms or a halogen, and $R_1$ and $R_2$ may be the same or different. m and n each represent the number of substituents and are each an integer of 0 to 4. $R_3$ and $R_4$ are each independently a hydrogen atom or an alkyl group having 1 to 10 carbon atoms or a phenyl group, and $R_3$ and $R_4$ may be bonded to form a ring.

Examples of the aromatic dihydroxy compound represented by the above general formula (a) or general formula (b) include bis(4-hydroxyphenyl)methane, 1,1-bis(4-hydroxyphenyl)ethane, 2,2-bis(4-hydroxyphenyl)propane, 2,2-bis(4-hydroxyphenyl)butane, 2,2-bis(4-hydroxyphenyl)octane, bis(4-hydroxyphenyl)phenylmethane, 2,2-bis(4-hydroxy-3-methylphenyl)propane, 1,1-bis(4-hydroxy-3-tert-butylphenyl)propane, 2,2-bis(4-hydroxy-3-bromophenyl)propane, 1,1-bis(4-hydroxyphenyl)cyclopentane, 1,1-bis(4-hydroxyphenyl)cyclohexane, 4,4'-dihydroxydiphenyl ether, 4,4'-dihydroxy-3,3'-dimethylphenyl ether, 4,4'-dihydroxyphenyl sulfide, 4,4'-dihydroxy-3,3'-dimethyldiphenyl sulfide, 4,4'-dihydroxydiphenyl sulfoxide, 4,4'-dihydroxy-3,3'-dimethyldiphenyl sulfoxide, 4,4'-dihydroxydiphenyl sulfone, 4,4'-dihydroxydiphenyl sulfone, and 4,4'-dihydroxy-3,3'-dimethyldiphenyl sulfone. Among these, particularly 2,2'-bis(4-hydroxyphenyl)propane (bisphenol A: BPA) is preferred in terms of strength, heat resistance, durability, or bending workability. Two or more types of aromatic dihydroxy compounds represented by general formula (a) can also be used in combination.

Other components may be added to the transparent synthetic resin layer (A) in the present invention, and the other components are not particularly limited and can be appropriately selected according to the purpose. Examples of the other components include an antioxidant, a release agent, an ultraviolet absorbing agent, a fluidity modifier, a crystal nucleating agent, a reinforcing agent, a dyestuff, an antistatic agent, and an antimicrobial agent. One of these may be used alone, or two or more of these may be used in combination. The transparent synthetic resin layer (A) in the present invention can be manufactured by injection molding, compression molding, extrusion molding, cast molding, or the like. The thickness of the transparent synthetic resin layer (A) in the present invention is preferably 50 μm to 1.5 mm, more preferably 100 μm to 800 μm.

As described above, for the above resin layer (A), the above resin illustrated may be used in a single layer, or the above resin layer (A) may be used as a multilayer sheet or film obtained by laminating and integrating two or more types of different resins. The method of lamination is not particularly limited, but a coextrusion molding method is desired because lamination can be performed with good close adhesiveness. It is also preferred to use a multilayer sheet or film obtained by laminating and integrating a layer comprising an aromatic polycarbonate resin in terms of heat resistance and impact resistance and a layer comprising a poly(meth)acrylate in terms of abrasion resistance. In this case, it is preferred to dispose the resin layer (A) with respect to the functional layer (B) so that the layer comprising the poly(meth)acrylate is located on the side of the surface of the synthetic resin laminate, and the layer comprising the aromatic polycarbonate resin is located on the side of the functional layer (B).

The synthetic resin laminate of the present invention has two or more functional layers (B) having photochromic properties interposed between the above two synthetic resin layers (A), and the functional layer (B) is a cured layer comprising a photochromic dye and obtained by mixing a diisocyanate and a polyol. Such a functional layer (B) can be formed, for example, by curing a mixture of a polyurethane prepolymer, a curing agent, and a photochromic dye (and a light stabilizer, an antioxidant, and the like as needed).

In the present invention, having two or more functional layers (B) having photochromic properties is one of the features. Such a configuration can solve a problem in the prior art, that is, the problem of due to the low solubility of a photochromic dye, the thickness of a polyurethane resin layer having photochromic properties increasing in order to obtain sufficient contrast, and it being difficult to perform control so that the layer is smooth and the thickness is uniform.

The number of functional layers (B) having photochromic properties in the present invention is preferably two or three, more preferably two.

The functional layer (B) having photochromic properties in the present invention preferably contains a urethane-based resin containing a photochromic dye. The thickness of the individual functional layer (B) is preferably 5 μm to 25 μm, more preferably 10 μm to 20 μm, in terms of close adhesiveness, strength, and thickness precision. The total of the thicknesses of all functional layers (B) interposed between the above two transparent synthetic resin layers (A) is preferably 30 μm or more, more preferably 35 μm to 50 μm.

As the above urethane-based resin, it is preferred to use a polyurethane prepolymer obtained by reacting a diisocyanate with a polyol in a fixed proportion, that is, a compound having isocyanate groups at both ends obtained from a diisocyanate and a polyol. As the diisocyanate compound, diphenylmethane-4,4'-diisocyanate (MDI) is preferred. As the polyol, polypropylene glycol (PPG) having a degree of polymerization of 5 to 30 is preferably used. The number average molecular weight of the polyurethane prepolymer is preferably 500 to 5000, more preferably 1500 to 4000, and particularly preferably 2000 to 3000.

On the other hand, the above curing agent is not particularly limited as long as it is a compound having two or more hydroxyl groups. A polyurethane polyol, a polyether polyol, a polyester polyol, an acrylic polyol, a polybutadiene polyol, a polycarbonate polyol, and the like are illustrated, and among them, a polyurethane polyol having a hydroxyl group at an end obtained from a particular isocyanate and a particular polyol is preferred. Particularly a polyurethane polyol having hydroxyl groups for at least both end groups derived from a diisocyanate and a polyol is preferred, and as the diisocyanate, tolylene diisocyanate (TDI) is preferably used. As the polyol, polypropylene glycol (PPG) having a degree of polymerization of 5 to 30 is preferably used. The number average molecular weight of this curing agent is preferably 500 to 5000, more preferably 1500 to 4000, and particularly preferably 2000 to 3000. A solvent such as ethyl acetate, tetrahydrofuran, and toluene may be added to the polyurethane prepolymer and curing agent for viscosity adjustment.

The photochromic dye used in the present invention is not particularly limited as long as it has compatibility with the urethane-based resin. A spiropyran-based compound, a spirooxazine-based compound, and a naphthopyran-based compound are preferred. Various additives, for example, a UV absorbent, an antioxidant, and an antifoaming agent, can also be added to this functional layer (B). In order to ensure the life of the photochromic dye in the present invention, various stabilizers are preferably added. Examples of these stabilizers can include a hindered amine-based light stabilizer and an antioxidant such as a hindered phenol.

Examples of the above hindered amine-based light stabilizer can include bis(2,2,6,6-tetramethyl-4-piperidyl)sebacate, bis(1,2,2,6,6-pentamethyl-4-piperidy/sebacate, bis(1,2,2,6,6-pentamethyl-4-piperidyl)-2-(3,5-di-tert-butyl-4-hydroxybenzyl)-2-n-butylmalonate, 1-methyl-8-(1,2,2,6,6-pentamethyl-4-piperidyl)-sebacate, 1-[2-[3-(3,5-di-tert-butyl-4-hydroxyphenyl)propionyloxy]ethyl]-4-[3-(3,5-di-tert-butyl-4-hydroxyphenyl)propionyloxy]-2,2,6,6- tetramethylpiperidine, 4-benzoyloxy-2,2,6,6-tetramethylpiperidine, tetrakis(2,2,6,6-tetramethyl-4-piperidyl)-1,2,3,4-butane-tetracarboxylate, triethylenediamine, and 8-acetyl-3-dodecyl-7,7,9,9-tetramethyl-1,3,8-triazaspiro[4,5]decane-2,4-dione. In addition, as a nickel-based ultraviolet stabilizer, [2,2'-thiobis(4-tert-octylphenolate)]-2-ethylhexylamine nickel, nickel complex-3,5-di-t-butyl-4-hydroxybenzylphosphoric acid monoethylate, nickel dibutyl-dithiocarbamate, and the like can also be used. Particularly as the hindered amine-based light stabilizer, a hindered amine-based light stabilizer containing only a tertiary amine is preferred, and specifically, bis(1,2,2,6,6-pentamethyl-4-piperidyl)-sebacate, bis(1,2,2,6,6-pentamethyl-4-piperidyl)-2-(3,5-di-tert-butyl-4-hydroxybenzyl)-2-n-butylmalonate, or a condensate of 1,2,2,6,6-pentamethyl-4-piperidinol/tridecyl alcohol and 1,2,3,4-butanetetracarboxylic acid is preferred.

As the above antioxidant, antioxidants such as various hindered phenols can be used, and especially, a phenol-based antioxidant, a thiol-based antioxidant, and a phosphite-based antioxidant are preferably used.

Examples of the above phenol-based antioxidant can include 1,1,3-tris(2-methyl-4-hydroxy-5-tert-butylphenyl)butane, 2,2'-methylenebis(4-ethyl-6-tert-butylphenol), tetrakis-[methylene-3-(3',5'-di-tert-butyl-4'-hydroxyphenyl)propionate]methane, 2,6-di-tert-butyl-p-cresol, 4,4'-thiobis(3-methyl-6-tert-butylphenol), 4,4'-butylidenebis(3-methyl-6-tert-butylphenol), 1,3,5-tris(3',5'-di-tert-butyl-4'-hydroxybenzyl)-S-triazine-2,4,6-(1H,3H,5H)trione, stearyl-β-(3,5-di-tert-butyl-4-hydroxyphenyl)propionate, triethylene glycol bis[3-(3-tert-butyl-5-methyl-4-(13)hydroxyphenyl)propionate], 3,9-bis[1,1-di-methyl-2-[β-(3-tert-butyl-4-hydroxy-5-methylphenyl)propionyloxy] ethyl]-2,4,8,10-tetraoxaspiro[5,5]undecane, and 1,3,5-trimethyl-2,4,6-tris(3,5-di-tert-butyl-4-hydroxybenzyl)benzene. Particularly, as the phenol-based antioxidant, one having a molecular weight of 550 or more is preferred.

The synthetic resin laminate of the present invention has the transparent resin layer (C) interposed between the above two or more functional layers (B) having photochromic properties. There may be two or more of these transparent resin layers (C) when the number of functional layers (B) having photochromic properties is three or more.

The resin used for the transparent resin layer (C) in the present invention can be selected, for example, from the group consisting of an aromatic polycarbonate, a poly(meth)acrylate, acetyl cellulose, a polyamide, a polyester, and a mixture of an aromatic polycarbonate and an alicyclic polyester. Among the above resins, acetyl cellulose is preferred in terms of transparency, a low birefringence index, and solvent resistance. Examples of the acetyl cellulose include triacetyl cellulose (TAC) and diacetyl cellulose. Especially triacetyl cellulose (TAC) is preferred. The thickness of the transparent resin layer (C) in the present invention is preferably 10 μm to 300 μm, more preferably 30 μm to 100 μm.

Various known additives can be added to the transparent resin layer (C) in the present invention according to the purpose in a range that does not impair its physical properties. For example, a heat stabilizer, a hydrolysis stabilizer, an antioxidant, a pigment, a dyestuff, a reinforcing agent, a filler, an ultraviolet absorbing agent, a lubricant, a release agent, a crystal nucleating agent, a plasticizer, a fluidity improving agent, an antistatic agent, and an antimicrobial agent can be added.

The transparent resin layer (C) in the present invention may have polarization properties.

In the present invention, the synthetic resin laminate preferably has the resin layer (D) having polarization properties and the adhesive material layer (E) between one of the above functional layers (B) and one of the above synthetic resin layers (A) present opposite to the above resin layer (C) in order from the side of the above functional layer (B).

For the above resin layer (D) having polarization properties, a film manufactured by dyeing a film of a polyvinyl alcohol-based resin with a dichroic organic dyestuff and stretching the film is preferably used. As this polyvinyl alcohol, polyvinyl alcohol (PVA), a substance in which a slight amount of the acetate structure of PVA is left, and polyvinyl formal, polyvinyl acetal, and an ethylene-vinyl acetate copolymer saponified product, which are PVA derivatives or analogs, and the like are illustrated, and particularly PVA is preferred. While a film of this polyvinyl alcohol-based resin is stretched in one direction, a dichroic organic dyestuff is impregnated or adsorbed, appropriately fixed, and dried to form a polarizing film.

The weight average molecular weight of PVA is preferably 50,000 to 350,000, more preferably 150,000 to 300,000. The thickness of the PVA film before stretching is usually about 100 to 300 μm, and the thickness of the PVA polarizing film after stretching is preferably about 10 to 50 μm.

The stretching ratio of the PVA film is preferably 2 to 8 times and is appropriately selected according to the purpose, and is more preferably 3 to 6 times in terms of strength after stretching.

The above adhesive material layer (E) may be any adhesive used for the usual bonding of a PC film and a polarizing film, but the polyurethane resin used for the above functional layer (B) having photochromic properties is preferably used as the adhesive. Particularly, using a two-component polyurethane comprising a polyurethane prepolymer and a curing agent is preferred considering subsequent work. The thickness of the above adhesive material layer (E) is preferably in the range of 5 to 100 μm, more preferably 5 to 50 μm. When the thickness is less than 5 μm, sufficient adhesive force may be difficult to obtain. When the thickness is more than 100 μm, the adhesive force is sufficient, but it takes time to volatilize the solvent in the adhesive material layer, and the productivity and the economy may worsen. It is also possible to add a UV absorbent to this adhesive layer to allow the laminate to have UV cutting ability.

A method for manufacturing the lens of the present invention will be described below. A lens can be made by working the synthetic resin laminate of the present invention into an individual lens shape by punching or the like, and then subjecting the lens-shaped synthetic resin laminate to bending work into a spherical surface or an aspherical surface. In the case of use as an injection lens, a lens can be made by subjecting the synthetic resin laminate of the present invention to bending work, then inserting the synthetic resin laminate into a mold, and integrally injection-molding a transparent resin on the side of the depressed surface. Examples of the transparent resin include an aromatic polycarbonate, an amorphous polyolefin (alicyclic polyolefin), a polyacrylate, a polysulfone, acetyl cellulose, polystyrene, a polyester, a transparent polyamide, and a composition of an aromatic polycarbonate and an alicyclic polyester, or a mixture thereof. For sunglasses or goggles of which impact resistance and heat resistance are required, an aromatic polycarbonate is preferred. Especially a bisphenol A type polycarbonate is more preferred.

Then, the lens of the present invention can be subjected to hard coating treatment. A resin surface is known to be easily scratched compared with glass, and for sunglasses or goggles, it is strongly required to laminate hard coating layers on their surfaces in order to improve abrasion resistance. The material or work conditions of the hard coating can be appropriately selected from among those excellent in abrasion resistance, appearance, close adhesiveness to the lens of the present invention, or close adhesiveness to an inorganic layer such as a mirror coating or an antireflection coating with which the lens of the present invention is then coated. As the application method, a hard coating liquid is applied to a base material by a known method such as a dipping method, a spraying method, a roll coating method, or a spin coating method, dried, and heated as needed, and thus a film layer can be formed. The hard coating liquid can be made by dissolving or dispersing a hard coating composition in a solvent and further diluting the solution or the dispersion with a diluting solvent as needed. Examples of the diluting solvent can include an alcohol, a cellosolve, a ketone, an ester, and an ether.

Then, the lens of the present invention is fixed to a frame by lens edging, hole making, screw tightening, and the like to form eyewear (sunglasses, goggles, or the like).

EXAMPLES

Examples of the present invention will be described below, but the present invention is not limited to the following Examples in any way.

(1) Making of Photochromic Dye-Containing Resin Liquid Used for Functional Layer (B)

5 parts by weight of a curing agent and 65 parts by weight of ethyl acetate as a solvent were used based on 50 parts by weight of a polyurethane prepolymer to prepare a resin liquid. The above polyurethane prepolymer is a polyurethane prepolymer having an NCO group equivalent weight (equivalent weight is average molecular weight per functional group) of 1500 (one prepared from diphenylmethane-4,4'-diisocyanate (MDI) and polypropylene glycol (PPG) having an average degree of polymerization of 15). The above curing agent is a curing agent having a hydroxyl group equivalent weight of 1050 (one prepared from tolylene diisocyanate and polypropylene glycol having an average degree of polymerization of 10). 0.2 parts by weight of "Ruby" from Vivimed as a photochromic dye was uniformly mixed into the above resin liquid to form a photochromic dye-containing resin liquid.

(2) Making of Polarizing Film (Resin Layer (D) Having Polarization Properties)

Polyvinyl alcohol (manufactured by KURARAY CO., LTD., trade name: VF-PS #7500) was stretched 2 times while being swelled in water at 35° C. for 270 seconds.

Then, it was stretched 3 times while being dyed in an aqueous solution at 35° C. comprising Kayarus Supra Blue BWL, Sumilight Red 4B, Sumilight Supra Orange 2 GL, and 10 g/L of anhydrous sodium sulfate.

This dyed film was stretched 4 times while being immersed in an aqueous solution comprising 2.3 g/L of nickel acetate and 4.4 g/L of boric acid at 35° C. for 120 seconds. The film was dried at room temperature for 3 minutes in a state in which the tense state was maintained, and then heat-treated at 110° C. for 3 minutes to obtain a polarizing film having a transmittance of 30% and a degree of polarization of 99%.

(3) Property Evaluation

Photochromic Performance Evaluation

Irradiation with pseudo-sunlight having an irradiation intensity of 50000 lux was performed in a constant temperature oven at 23° C. using a solar simulator HAL-320 (manufactured by Asahi Spectra Co., Ltd.). The transmittance (T1) 15 minutes after the start of the irradiation was measured by a spectrophotometer MCPD-7700 (manufactured by Otsuka Electronics Co., Ltd.). The transmittance (T2) at the time of no irradiation was measured in the same manner, and the contrast represented by the following (formula 1) was evaluated. The transmittance here is luminous transmittance in a 2-degree visual field using a C light source that is standardized by JIS Z-8701.

$$contrast = T2/T1 \quad (formula\ 1)$$

Appearance Evaluation

A synthetic resin laminate was irradiated with ultraviolet light using a UV surface irradiation apparatus LMH133F (manufactured by AITEC SYSTEM Co., Ltd.), and visually determined in a state in which the photochromic dye was colored.

Example 1

A photochromic dye-containing resin liquid (for a functional layer (B)) obtained by the method of the above (1) was applied to a triacetyl cellulose (TAC) film having a thickness of 40 μm (manufactured by Fujifilm Corporation) that was a resin layer (C) by a bar coater #42. Then, the solvent was volatilized under an atmosphere of 70° C. for 10 minutes, and the resin liquid surface and an aromatic polycarbonate film having a thickness of 320 μm and an Re of 5500 nm (manufactured by Mitsubishi Engineering-Plastics Corporation, trade name: Iupilon E-2000 (the same applies below)) that was a synthetic resin layer (A) were bonded.

A photochromic dye-containing resin liquid (for a functional layer (B)) obtained by the method of the above (1) was applied to the TAC film (resin layer (C)) surface of the obtained laminate in the same manner, and the resin liquid surface and an aromatic polycarbonate film having a thickness of 320 μm and an Re of 5500 nm that was a synthetic resin layer (A) were bonded.

The obtained synthetic resin laminate was heated and cured at 70° C. for 2 days. For the thus obtained synthetic resin laminate, the thickness of the functional layer (B) having photochromic properties was measured, and further the appearance was observed. The evaluation results of the synthetic resin laminate are shown in the following Table 1.

Example 2

A synthetic resin laminate was made in the same manner as Example 1 except that in Example 1, an integrally laminated film having a thickness of 300 μm comprising a poly(meth)acrylate resin having a thickness of 50 μm and an aromatic polycarbonate resin having a thickness of 250 μm that was manufactured by a coextrusion method was used instead of the aromatic polycarbonate film that was the synthetic resin layer (A), and lamination was performed so that the aromatic polycarbonate resin bonded to the photochromic dye-containing resin liquid. The synthetic resin laminate was evaluated in the same manner.

Example 3

A synthetic resin laminate was made in the same manner as Example 1 except that in Example 1, a polyamide film was used instead of the aromatic polycarbonate film that was the synthetic resin layer (A). The synthetic resin laminate was evaluated in the same manner.

Example 4

A TAC film (resin layer (C)) and an aromatic polycarbonate film (synthetic resin layer (A)) were bonded via a functional layer (B) having photochromic properties in the same manner as Example 1 (laminate 1). Next, a urethane adhesive (adhesive layer (E)) made in the same manner except that no photochromic dye was used in the method of the above (1) was applied to a polarizing film (resin layer (D)) having a thickness of about 30 μm obtained by the method of the above (2), using a microgravure coater. Then, the solvent was volatilized under an atmosphere of 70° C. for 10 minutes, and the adhesive layer (E) and an aromatic polycarbonate sheet having a thickness of 320 μm and an Re of 5500 nm that was a synthetic resin layer (A) were bonded (laminate 2).

A photochromic dye-containing resin liquid (for a functional layer (B)) obtained by the method of the above (1) was applied to the polarizing film (resin layer (D)) surface of the laminate 2 in the same manner and bonded to the TAC film (resin layer (C)) surface of the laminate 1. The obtained synthetic resin laminate was thermally cured in the same manner as Example 1 and evaluated in the same manner.

Example 5

A photochromic dye-containing resin liquid (for a functional layer (B)) obtained by the method of the above (1) was applied to a TAC film (resin layer (C)) having a thickness of 50 μm by a bar coater #36. Then, the solvent was volatilized under an atmosphere of 70° C. for 10 minutes, and the resin liquid surface and an aromatic polycarbonate film having a thickness of 320 μm and an Re of 5500 nm that was a synthetic resin layer (A) were bonded. Another set of the same was made, and a photochromic dye-containing resin liquid (for a functional layer (B)) obtained by the method of the above (1) was applied to the TAC film (resin layer (C)) surface of one of the laminates in the same manner using a bar coater #24, and bonded to the TAC film (resin layer (C)) surface of the other laminate. The obtained synthetic resin laminate was thermally cured in the same manner as Example 1 and evaluated in the same manner.

Example 6

A synthetic resin laminate was made in the same manner as Example 1 except that in Example 1, an aromatic polycarbonate film having a thickness of 300 μm was used as the resin layer (C) instead of the TAC film. The synthetic resin laminate was evaluated in the same manner.

Comparative Example 1

A photochromic dye-containing resin liquid (for a functional layer (B)) obtained by the method of the above (1) was applied to an aromatic polycarbonate sheet having a thickness of 320 μm and an Re of 5500 nm that was a synthetic resin layer (A) by a doctor blade having a gap of 150 μm. The solvent was volatilized under an atmosphere of 70° C. for 10 minutes, and an aromatic polycarbonate sheet having a thickness of 320 μm and an Re of 5500 nm that was a synthetic resin layer (A) was bonded to the resin liquid surface. This synthetic resin laminate was heated and cured at 70° C. for 2 days. The evaluation of the obtained synthetic resin laminate was performed in the same manner as Example 1.

Comparative Example 2

A synthetic resin laminate was made in the same manner as Comparative Example 1 except that in Comparative Example 1, the photochromic dye-containing resin liquid (for a functional layer (B)) was applied using a bar coater #42. The synthetic resin laminate was evaluated in the same manner.

Comparative Example 3

A urethane adhesive (adhesive layer (E)) made in the same manner except that no photochromic dye was used in the method of the above (1) was applied to a polarizing film (resin layer (D)) having a thickness of about 30 μm obtained by the method of the above (2), using a microgravure coater. Then, the solvent was volatilized under an atmosphere of 70° C. for 10 minutes, and the adhesive layer (E) and an aromatic polycarbonate sheet having a thickness of 320 μm and an Re of 5500 nm that was a synthetic resin layer (A) were bonded.

A photochromic dye-containing resin liquid (for a functional layer (B)) obtained by the method of the above (1) was applied to the polarizing film (resin layer (D)) surface of the obtained laminate by a doctor blade having a gap of 150 μm. The solvent was volatilized under an atmosphere of 70° C. for 10 minutes, and an aromatic polycarbonate sheet having a thickness of 320 μm and an Re of 5500 nm that was a synthetic resin layer (A) was bonded to the resin liquid surface. The obtained synthetic resin laminate was thermally cured in the same manner as Example 1 and evaluated in the same manner.

TABLE 1

| | Synthetic resin layer (A) | Resin layer (C) | Number of functional layers (B) | Resin layer (D) and adhesive layer (E) | Functional layer (B) Thickness (μm) | Coloring Unevenness | Contrast |
|---|---|---|---|---|---|---|---|
| Example 1 | PC | TAC | 2 | Not exist | 23/23 | Good | 1.60 |
| Example 2 | PMMA/PC | TAC | 2 | Not exist | 21/22 | Good | 1.48 |
| Example 3 | PA | TAC | 2 | Not exist | 23/23 | Good | 1.97 |
| Example 4 | PC | TAC | 2 | Exist | 18/18 | Good | 1.75 |
| Example 5 | PC | TAC | 3 | Not exist | 20/15/19 | Good | 1.84 |
| Example 6 | PC | PC | 2 | Not exist | 22/21 | Good | 1.53 |
| Comparative Example 1 | PC | Not exist | 1 | Not exist | 38 | Poor | 1.67 |

TABLE 1-continued

| | Synthetic resin layer (A) | Resin layer (C) | Number of functional layers (B) | Resin layer (D) and adhesive layer (E) | Functional layer (B) Thickness (μm) | Coloring Unevenness | Contrast |
|---|---|---|---|---|---|---|---|
| Comparative Example 2 | PC | Not exist | 1 | Not exist | 22 | Good | 1.28 |
| Comparative Example 3 | PC | Not exist | 1 | Exist | 39 | Poor | 1.62 |

As is clear from the present Examples, the present invention can provide a synthetic resin laminate having photochromic properties that has good contrast during coloring and has no in-plane coloring unevenness, and eyewear that is sunglasses, goggles, or lenses using the synthetic resin laminate.

REFERENCE SIGNS LIST

A: transparent synthetic resin layer (A)
B: functional layer (B) having photochromic properties
C: transparent resin layer (C)
D: resin layer (D) having polarization properties
E: adhesive material layer (E)

The invention claimed is:

1. A synthetic resin laminate comprising two transparent synthetic resin layers (A), two or more functional layers (B) having photochromic properties interposed between the two synthetic resin layers (A), and a transparent resin layer (C) interposed between the two or more functional layers (B), wherein the functional layer (B) is a cured layer comprising a photochromic dye and obtained from a diisocyanate and a polyol,
wherein the transparent resin layer (C) interposed between the functional layers (B) comprises one or more selected from the group consisting of an aromatic polycarbonate, a poly(meth)acrylate, acetyl cellulose, a polyamide, a polyester, and a mixture of an aromatic polycarbonate and an alicyclic polyester.

2. The synthetic resin laminate according to claim 1, comprising a resin layer (D) having polarization properties and an adhesive material layer (E) between one of the functional layers (B) and one of the synthetic resin layers (A) present opposite to the resin layer (C) in order from the side of the functional layer (B).

3. The synthetic resin laminate according to claim 1, wherein the resin layer (C) has polarization properties.

4. The synthetic resin laminate according to claim 1, wherein a total of thicknesses of all functional layers (B) interposed between the two transparent synthetic resin layers (A) is 30 μm or more, and a thickness of the individual functional layer (B) is 25 μm or less.

5. The synthetic resin laminate according to claim 1, wherein at least one of the transparent synthetic resin layers (A) is a single layer comprising one selected from the group consisting of an aromatic polycarbonate, a poly(meth)acrylate, acetyl cellulose, a polyamide, and a mixture of an aromatic polycarbonate and an alicyclic polyester, or a multilayer obtained by laminating and integrating two or more thereof.

6. The synthetic resin laminate according to claim 5, wherein both of the transparent synthetic resin layers (A) are single layers comprising an aromatic polycarbonate.

7. The synthetic resin laminate according to claim 1, wherein the transparent resin layer (C) interposed between the functional layers (B) comprises an aromatic polycarbonate or acetyl cellulose.

8. The synthetic resin laminate according to claim 7, wherein the transparent resin layer (C) interposed between the functional layers (B) comprises triacetyl cellulose.

9. A lens obtained by subjecting the synthetic resin laminate according to claim 1 to bending work into a spherical surface or an aspherical surface.

10. A lens obtained by subjecting the synthetic resin laminate according to claim 1 to bending work, and comprising an integrally injection-molded body of a transparent resin on the side of a depressed surface.

11. Eyewear using the lens according to claim 9.

* * * * *